United States Patent Office 3,314,896
Patented Apr. 18, 1967

3,314,896
CYCLIC EPOXIDES AND COMPOSITIONS
CONTAINING SAME
Samuel W. Tinsley, Jr., South Charleston, and Erich Marcus, Charleston, W. Va., assignors to Union Carbide Corporation, a corporation of New York
No Drawing. Filed Dec. 29, 1961, Ser. No. 163,059
19 Claims. (Cl. 260—2)

This invention relates to novel cyclic epoxides and, more particularly, to vic-epoxyalkyl - vic - epoxycyclopentanes; vic - epoxyalkyl(vic-epoxycycloalkyl) - vic - epoxycyclopentanes; and vic - epoxyalkyl(vic - epoxycycloalkyl - vic-epoxycycloalkyl)-vic-epoxycyclopentanes, and polymerizable compositions containing same. In one aspect, the invention relates to curable polymerizable compositions comprising the above-mentioned novel epoxides and a catalyst and/or an active organic hardener. In other respects, the invention relates to fusible thermosetting intermediate reaction products and to the fully cured products which result from the aforementioned curable compositions.

The curable compositions of this invention are especially useful in resin-forming operations such as coating, laminating, bonding, molding, casting, potting and the like. They furthermore are capable of accepting solid materials, such as fillers and pigments, for providing various effects in physical properties and coloration. With or without such added solid materials, these curable compositions can be made to fill small intricacies of molds without the necessity of applying high pressures or heating to high temperatures, although such measures can be employed, if desired. The curable compositions also can be easily spread, brushed, or sprayed by many techniques available in the paint, lacquer, and varnish industries for making coatings and finishes. Negligible shrinkage, if any, occurs in curing to the resin. The curable compositions are capable of being accurately shaped by molds having intricate molding surfaces and fully cured to resins carrying exact details of such molding surfaces. They can be also advantageously employed in the potting of such fragile articles as electronic components.

The curable compositions described above also can be partially reacted at elevated temperatures to form viscous thermosetting liquids or thermosetting solids. The resulting fusible thermosetting intermediate reaction products can be dissolved in an inert normally-liquid organic medium and applied as heat-curable coatings. To aid solution, the thermosetting solid products can be powdered or granulated, if desired. The thermosetting solids also can be used as molding powder compositions which can be converted to fully cured solid products by the application of heat and/or pressure. Numerous other uses, applications, and unexpected advantages and results will become apparent upon a consideration of the various embodiments of the invention which are discussed hereinafter.

The novel cyclic epoxides include vic-epoxyalkyl-vic-epoxycyclopentanes; vic - epoxyalkyl(vic - epoxycycloalkyl) - vic - epoxycyclopentanes; and vic - epoxyalkyl-(vic - epoxycycloalkyl - vic - epoxycycloalkyl) - vic-epoxycyclopentanes wherein the vic-epoxyalkyl substituent contains up to 18 carbon atoms and wherein the vic-epoxycycloalkyl substituent contains the vic-epoxy group as a part of the ring thereof and contains no more than 7 carbon atoms in the ring thereof. These novel epoxides are represented by the formula (I) 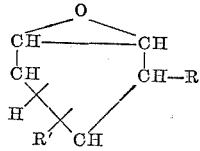

wherein R is a vic-epoxyalkyl group preferably having up to 18 carbon atoms or an aryl-substituted vic-epoxyalkyl preferably having up to 18 carbon atoms in the alkyl moiety, e.g., phenyl-substituted vic-epoxyalkyl; and R' is hydrogen, alkyl preferably having from 1 to 8 carbon atoms, vic-epoxycycloalkyl preferably having 5 to 7 carbon atoms in the ring thereof and containing the vic-epoxy group as a part of the ring, or vic-epoxycycloalkyl-vic-epoxycycloalkyl group preferably having 5 to 7 carbon atoms in each cycloalkyl ring thereof and containing the vic-epoxy group in each cycloalkyl ring thereof. When R' is hydrogen or alkyl and R is vic-epoxyalkyl, the vic-epoxy moiety of R is at least one carbon atom removed from the vic-epoxycyclopentane nucleus. The term "vic-epoxy," as used herein, designates the (II) 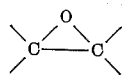

group.

Typical vic-epoxyalkyl groups include 2,3-epoxy-2-methylpropyl; 2,3-epoxypropyl; 2,3-epoxy-1,2-dimethylpropyl; 2,3-epoxyoctyl; 2,3-epoxy-2-phenylpropyl; 2,3-epoxybutyl; 2,3-epoxy-2-methylbutyl; 2,3-epoxyhexyl; 2,3-epoxyheptyl; 2,3-epoxypentyl; 2,3-epoxyundecyl; 2,3-epoxydecyl; 2,3-epoxyoctadecyl; and the like. A representative vic-epoxycycloalkyl group as an R' group or as a part of a vic-epoxycycloalkyl-vic-epoxycycloalkyl group is 2,3-epoxycyclopentyl such that the vic-epoxycycloalkyl-vic-epoxycycloalkyl group is 4-(2,3-epoxycyclopentyl)-2,3-epoxycyclopentyl.

Typical novel cyclic epoxides are 1,2-epoxy-3-(2,3-epoxy - 2 - methylpropyl)cyclopentane; 1,2 - epoxy - 3-(2,3 - epoxypropyl)cyclopentane; 1,2 - epoxy - 3 - (2,3-epoxy - 1,2 - dimethylpropyl)cyclopentane; 1,2 - epoxy-3 - (2,3 - epoxyoctyl)cyclopentane; 1,2 - epoxy - 3 - (2,3-epoxy - 2 - phenylpropyl)cyclopentane; 1,2 - epoxy - 4-(or 5) - (2,3 - epoxycyclopentyl) - 3 - (2,3 - epoxy - 2-methylpropyl)cyclopentane; and 1,2 - epoxy - 4 - [4-(2,3-epoxycyclopentyl) - 2,3 - epoxycyclopentyl] - 3 - (2,3-epoxy-2-methylpropyl)cyclopentane, and the like.

The novel cyclic epoxides described above are prepared by the epoxidation of olefinically unsaturated precursors such as the alkenylcyclopentenes; alkenyl(cycloalkenyl)cyclopentenes; and alkenyl(cycloalkenylcycloalkenyl)cyclopentenes which are represented by the formula (III) 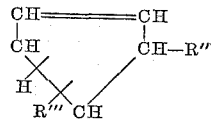

wherein R" is an alkenyl group having up to 18 carbon atoms or an aryl-substituted alkenyl group having up to 18 carbon atoms in the alkenyl moiety thereof and R''' is hydrogen, alkyl having 1 to 8 carbon atoms, a cycloalkenyl group having 5 to 7 carbon atoms or a cyclokenylcycloalkenyl group wherein each cycloalkenyl group thereof contains from 5 to 7 carbon atoms. Typical recursors include 3-methallylcyclopentene; 3-allylcyclopentene; 3-(1,2-dimethyl-2-propenyl)cyclopentene; 3-(2-ctenyl)cyclopentene; alpha-(2-cyclopentenylmethyl)-styrene; 4-(2-cyclopentenyl)-3-methallylcyclopentene; 5-(2-yclopentenyl)-3-methallylcyclopentene; and the like.

In general, an advantageous method for preparing the recursors involves the reaction of a 3-halocyclopentene with an olefin such as isobutylene, propylene, trimethylthylene, diisobutylene, alpha-methylstyrene, cyclopentaiene, and the like, in the presence of a catalyst such as inc chloride while maintaining a low temperature such s 5° C. to as low as —35° C. There results a 3-(2-aloalkyl)cyclopentene which is then dehydrohalogenated to produce the olefinically unsaturated precursor, e.g., ne 3-alkenylcyclopentene. The dehydrohalogenation is onducted in the presence of a base such as the basic lkoxides including potassium tert-butoxide, sodium hyroxide dissolved in ethanol, sodium isopropoxide, and he like, or the basic amines including 5-ethyl-2-methyl-yridine, tri-n-butylamine, 2,4,6-collidine, and the like. n general, the selection of the base catalyst determines he position of the double bond of the alkenyl substituent nd, to some extent, determines the minimum temperature t which the dehydrohalogenation can be conducted. For xample, dehydrochlorination with 5-ethyl-2-methylpyridine or tri-n-butylamine at 175° C. tends to provide a redominance of 3-alkenylcyclopentene wherein the double bond of the alkenyl group is closest to the cyclopentene group over the 3-alkenylcyclopentene wherein the double bond is further removed from the cyclopentene group. The more hindered and more basic catalysts such is 2,4,6-collidine or potassium tert-butoxide produce a redominance of 3-alkenylcyclopentene having the double bond of the alkenyl group further removed from the cyclopentene group over 3-alkenylcyclopentenes wherein the double bond of the alkenyl group is closer to the cyclopentene group. Potassium tert-butoxide yielded at 30° C. approximately 95% of the 3-alkenylcyclopentene wherein the double bond is further removed from the cyclopentene group and approximately 5% of the 3-alkenylcyclopentene wherein the double bond of the alkenyl roup is closer to the cyclopentene group.

This invention also embraces certain novel olefinically unsaturated precursors which are represented by Formula III given above wherein R''' is a cyclopentenyl group or a cyclopentenylcyclopentenyl group. Examples of these novel precursors include 4-(or 5)-(2-cyclopentenyl)-3-methallylcyclopentene; 4-[4-(2-cyclopentenyl)-2-cyclopentenyl]-3-methallylcyclopentene; alpha-[4-(or 5)-(2-cyclopentenyl)-3-cyclopentenylmethyl]styrene; 4-(or 5)-(2-cyclopentenyl)-3-octenylcyclopentene, and the like.

The epoxidation of the olefinically unsaturated precursor to provide the novel cyclic epoxides of this invention is advantageously carried out with an organic peracid including the aliphatic peracids, e.g., peracetic acid, perpropionic acid, perbutyric acid, and the like, the cycloaliphatic peracids, and the aromatic peracids, e.g., perbenzoic acid, monoperphthalic acid, and the like. It is advantageous to employ the peracid as a solution in an inert solvent such as ethyl acetate, butyl acetate, acetone, and the like, in amounts of from 10 to 50 weight percent, preferably 20 to 40 weight percent of peracide. The epoxidation is best conducted at a temperature in the range from about 0° C. or lower to about 100° C., and higher, preferably 25° C. to 75° C. It is preferable to employ an excess (e.g., about 25%) of peracid over the stoichiometric amount of olefin desired to be epoxidized. The epoxidation is conducted for a period of time which is sufficient to provide the desired number of oxirane oxygen additions to double bonds as indicated by periodic analyses of samples of the reaction mixture to determine the quantity of peracide consumed during the epoxidation. When the epoxidation has reached the desired extent, recovery procedures, e.g., distillation under reduced pressure and conventional purification procedures are employed to separate the novel cyclic epoxide from the precursor, acid by-products, unspent peracid, and inert solvent, if employed.

The novel cyclic epoxides are polymerizable through their vic-epoxy groups in the presence of a basic or acidic catalyst with or without added active organic hardeners and/or other vic-epoxy organic compounds. Suitable acidic and basic catalysts which are employed include, for example, the metal halide Lewis acids, e.g., boron trifluoride, aluminum chloride, zinc chloride, stannic chloride, ferric chloride, boron trifluoride-piperidine complex, boron trifluoride-1,6-hexanediamine complex, boron trifluoride-monoethylamine complex, boron trifluoride-dimethyl ether complex, boron trifluoride-diethyl ether complex, boron trifluoride-dipropyl ether complex, and the like; the strong mineral acids, e.g., sulfuric acid, phosphoric acid, polyphosphoric acid, perchloric acid, and the like; the saturated aliphatic hydrocarbon sulfonic acids and the aromatic hydrocarbon sulfonic acids, e.g., ethanesulfonic acid, propanesulfonic acid, benzenesulfonic acid, toluenesulfonic acid, naphthalenesulfonic acid, lower alkyl substituted-benzenesulfonic acid, and the like; the alkali metal hydroxides, e.g., sodium hydroxide, potassium hydroxide, and the like; the tertiary amines, e.g., alpha-methylbenzyldimethylamine, dimethylethylamine, triethylamine, tripropylamine, trimethylammonium hydroxide, and the like.

The amount of catalyst employed can be varied over a wide range, for example, 0.01 to 15 weight percent based on the weight of epoxide present including the novel cyclic epoxides and any other vic-epoxy organic compounds mixed therewith. The catalyst can be employed as a solution in a suitable solvent, if desired, and the temperature of polymerization can be varied over a wide range, e.g., 25° C. to 250° C.

Active organic hardeners such as polycarboxylic acids and/or anhydrides, polycarboxy polyesters, polyols, e.g., polyhydric phenols, polyhydric alcohols and polyhydric polyesters, polyfunctional amines, polythiols, polyisocyanates, polyisothiocyanates, polyacyl halides and the like, are mixed with the novel cyclic epoxides with or without other vic-epoxy organic compounds to provide curable compositions which are polymerizable with or without the application of heat. These curable compositions can be partially or fully cured, for example, at temperatures from 25° C. and lower to 250° C. and higher and basic or acidic catalysts as set forth above can be added to the mixture of epoxide and hardener to assist in increasing the cure rate or lower the curing temperature.

The amount of organic hardener employed can be in the range of 0.1 to about 4 (preferably 0.1 to about 2) active groups of the hardener, e.g., carboxy groups of the polycarboxylic acid and/or anhydride, and/or the polycarboxy polyester and/or the polyacyl halide, the hydroxy groups of polyols, or the amine groups of the polyfunctional amines, per vic-epoxy group of the novel epoxide and any other vic-epoxy organic compound contained in the curable composition.

Representative organic hardeners for admixture and/or reaction with the novel cyclic epoxides include oxalic acid, succinic acid, glutaric acid, adipic acid, suberic acid, alkylsuccinic acids, alkenylsuccinic acids, maleic acid, itaconic acid, 3-hexynedioic acid, 1,2-cyclohexanedicarboxylic acid, phthalic acid, terephthalic acid, phthalic anhydride, tetrahydrophthalic anhydride, maleic anhydride, glutaric anhydride, succinic anhydride, nonenylsuccinic anhydride, 1,8-naphthalic anhydride, lower alkyl substituted-bicyclo[2.2.1]hept-5-ene - 2,3 - dicarboxylic anhydride, methylbicyclo[2.2.1]hept-2-ene-2,3-dicarboxylic anhydride, ethylene glycol, diethylene glycol, the polyethylene glycols, propylene glycol, the polypropylene glycols, 1,1,1-trimethylolpropane, the polyvinyl alcohols, the cyclopentanediols, the cyclohexanediols, resorcinol, catechol, bis(4-hydroxyphenyl)-2,2-propane, -1,8 - naphthalenediol, polycarboxy polyesters prepared by known condensation procedures, employing mole ratios favoring greater than equivalent amounts of polycarboxylic acid or polycarboxylic acid anhydride, such as those listed above, with relation to the polyhydric alcohol, such as those listed above, and polyhydroxy polyesters prepared by known procedures, employing mole ratios favoring greater than equivalent amounts of polyhydric alcohol with relation to the polycarboxylic acid or anhydride.

The novel olefinically unsaturated precursors, i.e., the alkenyl(cyclopentenyl)cyclopentenes and the alkenyl(cyclopentenylcyclopentenyl)cyclopentene, are obviously useful as precursors in obtaining the novel cyclic epoxides and are further useful as monomers which are subjected to vinyl polymerization in the presence of suitable catalysts including the peroxides, e.g., benzoyl peroxide, ditertbutyl peroxide, dicumyl peroxide, tert-butyl perbenzoate, 2,3-dichlorobenzoyl peroxide, to form novel and useful polymers for such purposes as coating, molding, casting, and bonding uses. They are also copolymerizable with olefinically unsaturated compounds such as ethylene, vinyl chloride, styrene and the like to form novel copolymers useful as coatings, adhesives, molding compositions and the like.

The following examples are illustrative. All temperatures are on the centigrade scale and all parts and percentages are by weight unless otherwise specified. Resins were generally prepared in test tubes and examined after curing by breaking and removing the glass of the test tube. Barcol hardness values, unless otherwise noted, were determined with a Barcol Impressor, model GYZJ 934–1. Resin toughness was judged by its resistance to cutting with a knife. When applicable, resin properties were determined by the following standard procedures.

| Property: | ASTM method |
|---|---|
| Heat distortion point, °C. | D–648–45T |
| Izod impact, ft. lbs./in. notch | D–256–47T |
| Flexural strength, p.s.i. | D–790–58T |
| Tensile strength, p.s.i. | D–638–58T |

EXAMPLE 1

*3-(2-chloro-2-methylpropyl)cyclopentene*

Freshly distilled 3-chlorocyclopentene (307.5 g., 3 moles) was added during a period of two hours with stirring to a mixture of isobutylene (336 g., 6 moles) and pulverized zinc chloride (12 g.), while the temperature was maintained at −15°. The mixture was stirred for two more hours at the same temperature. After washing with water the reaction product was dried over calcium chloride and distilled without rectification to give 433 g. of 3-(2-chloro-2-methylpropyl)cyclopentene (91 percent yield), B.P. 55–65°/6 mm.

Redistillation through a 10″ column afforded an analytical sample, B.P. 35–36°/0.6 mm., $n20/D$ 1.4679, $d_4^{20}$ 0.9566. Elemental analysis gave the following results:

Calcd. for $C_9H_{15}Cl$: C, 68.12; H, 9.53; Cl, 22.39; $M_D$, 45.97. Found: C, 68.48; H, 9.61; Cl, 22.41; $M_D$, 46.10.

EXAMPLE 2

*3-methallylcyclopentene(A) and 3-(2-methylpropenyl)cyclopentene(B)*

3-(2-chloro-2-methylpropyl)cyclopentene (390 g., 2.46 moles) was added during a period of thirty minutes with stirring to 2-methyl-5-ethylpyridine (522 g., 4.3 moles), which had been heated to 175°. At the end of the addition the temperature had dropped to 160°. The mixture was stirred for an additional thirty minutes at 160° and distilled without rectification until the distillate reached a temperature of 170°. After washing with a 20 percent acetic acid solution, water, sodium bicarbonate, and again with water, the product was dried over calcium chloride and distilled through a 10″ column to give the expected diolefins, A and B (266 g., 88 percent yield), B.P. 148– 148.5, $n20/D$ 1.4631, $d_4^{20}$ 0.820. Elemental analysis provided the following results:

Calcd. for $C_9H_{14}$: C, 88.45; H, 11.55; $M_D$, 40.64; M.W., 122. Found: C, 88.14; H, 11.83; $M_D$, 41.05; M.W. (mass spectrometer), 122.

The isomers could be separated by vapor phase chromatography to give fairly pure samples for obtaining the infrared spectra of A and B. Vapor phase chromatography as well as the infrared spectra showed that the product contained about 35 percent of A and 65 percent of B.

EXAMPLE 3

*3-methallylcyclopentene(A) and 3-(2-methylpropenyl)cyclopentene(B)*

3 - (2-chloro-2-methylpropyl)cyclopentene (4 moles) was added to potassium tert-butoxide (5 moles) dissolved in refluxing tert-butanol (15 moles). The mixture was refluxed for forty hours with stirring. Workup afforded an 84 percent yield of product which contained 95 percent of A and 5 percent of B.

EXAMPLE 4

*2-methallylcyclopentene(A) and 3-(2-methylpropenyl)cyclopentene(B)*

3-(2-chloro-2-methylpropyl)cyclopentene (4 moles) was added to sodium isopropoxide (5 moles) dissolved in refluxing isopropanol (25 moles). The mixture was refluxed for forty hours with stirring. Workup afforded a good yield of a product which contained about 85 percent of A and 15 percent of B.

EXAMPLE 5

*1,2-epoxy-3-(2,3-epoxy-2-methylpropyl)cyclopentane and 1,2-epoxy-3-(1,2-epoxy-2-methylpropyl)cyclopentane*

To 250 g. of 3-methallylclopentene containing 5 percent of 3-(2-methyl-1-propenyl)cyclopentene, which was maintained with stirring at 35–40°, there were added dropwise over a period of 170 minutes 1550 g. of a 25 percent solution of peracetic acid in ethyl acetate. After an additional hour and one-half at 37° the theoretical amount of peracetic acid had been consumed. The volatiles were removed by codistillation with 1200 g. of ethylbenzene and the residue was distilled through an 8″ x 32 mm. glass helices-packed column. There was obtained, after a 21 g. heads cut, 291 g. of an admixture containing 95 weight percent of 1,2-epoxy-3-(2,3-epoxy-2-methylpropyl)cyclopentane and 5 weight percent of 1,2-epoxy-3-(1,2-epoxy-2-methylpropyl)cyclopentane, B.P. 94°/4.2 mm., $n30/D$ 1.4620, indicated purity 84 percent by epoxide analysis (pyridine hydrochloride method). Elemental analysis provided the following results:

Calcd. for $C_9H_{14}O_2$: C, 70.10; H, 9.15. Found: C, 69.44; H, 8.98.

EXAMPLE 6

*1,2-epoxy-3-(2,3-epoxy-2-methylpropyl)cyclopentane and 1,2-epoxy-3-(1,2-epoxy-2-methylpropyl)cyclopentane*

To 129 g. of 3-(2-methylpropenyl)cyclopentene containing 35 percent of 3-methallylcyclopentene, which was maintained with stirring between 35 and 40°, there was added dropwise over a period of one hundred and sixty-five minutes 795 g. of a 25.2 percent solution of peracetic acid in ethyl acetate. After an additional two and one-half hours at 35° the theoretical amount of peracetic acid had been consumed. The volatiles were removed by codistillation with 100 g. of ethylbenzene, and the residue was distilled through a short column to give 125 g. of an admixture containing about 65 weight percent of 1,2-epoxy-3-(1,2-epoxy-2-methylpropyl)cyclopentane and 35 weight percent of 1,2-epoxy-3-(2,3-epoxy-2-methylpropyl)cyclopentane, 86°/30 mm.–88°/2.25 mm., $n30/D$ 1.4587, indicated purity 83 percent by epoxide analysis (pyridine hydrochloride method).

EXAMPLE 7

3-(2-chloropropyl)cyclopentene

Propylene (286 g., 6.8 moles) was introduced during a period of two and one-half hours into a mixture of 3-chlorocyclopentene (205 g., 2 moles) and zinc chloride (8 g.), while the temperature was maintained between −20 and −25°. The unchanged propylene (210 g.) was collected in a cold trap and bubbled through the reaction mixture again during a period of one hour. After stirring for an additional thirty minutes at −20°, water (300 ml.) and petroleum ether (300 ml., B.P. 35–37°) were added, while the temperature was allowed to come up to 0°. The organic layer was separated, washed twice with water, dried over calcium chloride, and distilled through a 10″ column to give the crude product (86 g., 30 percent yield), B.P. 58–71°/7.5 mm. Redistillation gave the purified product (65 g.), 3-(2-chloropropyl)cyclopentene B.P. 59–63°/8 mm., $n20/D$ 1.4682, $d_4^{20}$ 0.971. Elemental analysis showed:

Calcd. for $C_8H_{13}Cl$: C, 66.42; H, 9.05; Cl, 24.53; $M_D$, 41.35. Found: C, 66.80; H, 9.14; Cl, 24.12; $M_D$, 41.3.

EXAMPLE 8

3-allylcyclopentene 3-(2-chloropropyl)cyclopentene (60 g., 0.42 mole) was added to potassium tert-butoxide (86 g., 0.75 mole) dissolved in refluxing tert-butanol (240 g.). The mixture was refluxed for thirty hours with stirring. After addition of some petroleum ether, the reaction mixture was washed twice with 1 liter of water. The organic layer was dried over calcium chloride and distilled through a Vigreux column to give the desired product, 3-allylcyclopentene (18 g., 40 percent yield), B.P. 119–121°, $n20/D$ 1.4550, $d_4^{20}$ 0.812. Elemental analysis showed:

Calcd. for $C_8H_{12}$: C, 88.82; H, 11.18; $M_D$, 36.02. Found: C, 88.69; H, 10.94; $M_D$, 36.1.

The infrared spectrum and vapor phase chromatography showed that the product contained at least 95 percent of the desired 3-allylcyclopentene. The mass spectrum was consistent with the proposed structure.

EXAMPLE 9

1,2-epoxy-3-(2,3-epoxypropyl)cyclopentane

To 150 g. of 3-allylcyclopentene, B.P. 120–121° C., which was maintained with stirring at 40°, there were added dropwise over a period of three hours 1036 g. of a 25.5 percent solution of peracetic acid in ethyl acetate. After an additional hour and one-half at 40° the temperature was raised to 50° and held there for two hours. The solution was then allowed to stand overnight at room temperature at the end of which time 95 percent of the theoretical amount of peracetic acid had been consumed. The volatiles were removed by codistillation with 1400 g. of ethylbenzene and the residue was distilled through a 8″ x 26 mm. column to give 35 g. of heads cut containing some 3-allyl-1,2-epoxycyclopentane and 133 g. of 1,2-epoxy-3-(2,3-epoxypropyl)cyclopentane, B.P. 61°/0.4 mm.–60°/0.35 mm., $n30/D$ 1.4640–1.4658, purity 90 percent as indicated by epoxide analysis (pyridine hydrochloride method). Elemental analysis showed:

Calcd. for $C_8H_{12}O_2$: C, 68.54; H, 8.63. Found: C, 68.69; H, 8.61.

EXAMPLE 10

3-(1,2-dimethyl-2-chloropropyl)cyclopentene 3-chlorocyclopentene (512.5 g., 5 moles) was added during a period of three and one-half hours with stirring to a mixture of trimethylethylene (420 g., 6 moles) and zinc chloride (20 g.), while the temperature was maintained between 0 and 5°. After stirring for an additional two hours at 5°, the mixture was washed with water, dried over calcium chloride, and distilled through a 10″ column to give 616 g. of the product, 3-(1,2-dimethyl-2-chloropropyl)cyclopentene, B.P. 70°/3 mm.–65°/2 mm. About 20 percent of the distillate had lost hydrogen chloride during the distillation and was therefore present in the form of a diolefin. The mass spectrum of the product was in agreement with the assigned structure.

EXAMPLE 11

3-(1,2-dimethyl-2-propenyl)cyclopentene

Crude 3 - (1,2 - dimethyl-2-chloropropyl)cyclopentene (610 g., 3.5 moles) was added to potassium tert-butoxide (570 g., 5.1 moles) dissolved in refluxing tert-butanol (1630 g.) The mixture was refluxed for seventy hours with stirring. After addition of 1 liter of water the organic layer was separated and distilled through a 10″ column to give 392 g. of 3-(1,2-dimethyl-2-propenyl)cyclopentene (83 percent yield), B.P. 82–85°/50 mm. Redistillation through the same column gave 384 g. of 3-(1,2-dimethyl-2-propenyl)cyclopentene, B.P. 71–73°/30 mm., in $n20/D$ 1.4662, $d_4^{20}$ 0.835. Elemental analysis showed:

Calcd. for $C_{10}H_{16}$: C, 88.16; H, 11.84; $M_D$, 45.26. Found: C, 87.52; H, 11.82; $M_D$, 45.1.

Vapor phase chromatography showed the presence of three compounds in 80, 16, and 4 percent amounts. The two major fractions, which could be separated by vapor phase chromatography, were identified by their mass and infrared spectra as 3-(1,2-dimethyl-2-propenyl)cyclopentene (80 percent) and 3-(1,2-dimethyl-1-propenyl)cyclopentene (16 percent).

EXAMPLE 12

1,2-epoxy-3-(2,3-epoxy-1,2-dimethylpropyl)cyclopentane

To 338 g. of 3-(1,2-dimethyl-2-propenyl)cyclopentene which was maintained with stirring at 25–30° there were added dropwise over a period of three hours and fifteen minutes 1740 g. of a 26 percent solution of peracetic acid in ethyl acetate. After an additional two hours at 30° the reaction mixture was stored overnight at 0° at the end of which time 98 percent of the theoretical amount of peracetic acid had been consumed. The volatiles were removed by codistillation with ethylbenzene at 25–30 mm. and the residue was distilled through an 8 inch x 42 mm. glass helices-packed column to give 26 g. of heads cut and 332 g. of 1,2-epoxy-3-(2,3-epoxy-1,2-dimethylpropyl)cyclopentane having the following properties: B.P. 70° C./0.1 mm., $n30/D$ 1.4640. Elemental analysis showed:

Calcd. for $C_{10}H_{16}O_2$: C, 71.38; H, 9.58. Found: C, 71.16; H, 9.42.

EXAMPLE 13

3-(2-chloro-2,4,4-trimethylpentyl)cyclopentene 3-chlorocyclopentene (205 g., 2 moles) was added during a period of two hours to a mixture of diisobutylene (448 g., 4 moles) and pulverized zinc chloride (16 g.), while the temperature was maintained between 20 and 25°. After stirring for an additional one and one-half hours, water (900 ml.) and petroleum ether (500 ml., B.P. 35–37°) were added. The organic layer was separated, washed twice more with water, and dried over calcium chloride. After removal of low-boiling material up to 45° at 1.2 mm., the desired adduct 3-(2-chloro-2,4,4-trimethylpentyl)cyclopentene was obtained as a residue product (300 g., 70 percent yield). It could not be distilled without decomposition.

EXAMPLE 14

3-(octenyl)cyclopentene

Crude 3 - (2-chloro-2,4,4-trimethylpentyl)cyclopentene (300 g., 1.4 moles) was added to an excess of potassium tert-butoxide dissolved in refluxing tert-butanol. The mixture was refluxed for ninety hours with stirring and worked up in a similar fashion to 3-allylcyclopentene. Distillation through a 10″ column gave 3-(octenyl)cyclopentene (164 g., 66 percent yield), B.P. 98–101°/18 mm., $n20/D$ 1.4678, $d_4^{20}$ 0.835. Elemental analysis showed:

Calcd. for $C_{13}H_{22}$: C, 87.56; H, 12.44; $M_D$, 59.12. Found: C, 87.41; H, 12.31; $M_D$, 59.3.

EXAMPLE 15

*1,2-epoxy-3-(epoxyoctyl)cyclopentane*

To 144 g. of 3-(octenyl)cyclopentene prepared in Example 14 and maintained with stirring at 35°, there were added dropwise over a period of two hours 612 g. of a 25.1 percent solution of peracetic acid in ethyl acetate. After an additional two hours at 35°, 95 percent of the theoretical amount of peracetic acid had been consumed. The volatiles were removed by codistillation with 1000 g. of ethylbenzene and the residue was distilled through a short packed column to give 141 g. of 1,2-epoxy-3-(epoxyoctyl)cyclopentane, B.P. 86°/0.15 mm., n30/D 1.4626– 1.4637. One of the isomers is believed to be the expected 1,2 - epoxy-3-(2,3-epoxy-2-neopentylpropyl)cyclopentene. Elemental analysis showed:

Calcd. for $C_{13}H_{22}O_2$: C, 74.24; H, 10.54. Found: C, 74.49; H, 10.23.

EXAMPLE 16

*3-(2-chloro-2-phenylpropyl)cyclopentene*

α-Methylstyrene (236 g., 2.0 moles) was added during a period of one hour and forty minutes with stirring to a mixture of 3-chlorocyclopentene (256 g., 2.5 moles) and zinc chloride (8 g.), while the temperature was maintained between —25 and —30°. After stirring for another one and one-half hours at —25°, water (300 ml.) and petroleum ether (300 ml., B.P. 32–60°) were added, while the temperature was allowed to come up to 0°. The organic layer was separated, washed with water, and dried over calcium chloride. After removal of solvent there remained a residue of 422 g. of the product, 3-(2-chloro-2-phenylpropyl)cyclopentene, which could not be distilled without decomposition.

EXAMPLE 17

*α-(2-cyclopentenylmethyl)styrene*

Crude 3-(2-chloro-2-phenylpropyl)cyclopentene (400 g., 1.8 moles) was added to potassium tert-butoxide (340 g., 3 moles) dissolved in refluxing tert-butanol (980 g.). The mixture was refluxed for twenty hours with stirring. After addition of 300 ml. of petroleum ether, the organic layer was washed twice with water and dried over calcium chloride. 2,6-di-tert-butyl-p-cresol (2 g.) was added as an inhibitor, and the organic layer was distilled through a Vigreux column to give 125 g. (37 percent yield), B.P. 90–100°/0.5 mm., of α-(2-cyclopentenylmethyl)styrene which was distilled through the same column to afford an analytical sample, B.P. 80–84°/0.3 mm., n20/D 1.581. Elemental analysis showed:

Calcd. for $C_{14}H_{16}$: C, 91.25; H, 8.75. Found: C, 91.10; H, 8.92.

The infrared and mass spectra were in agreement with the assigned structure.

EXAMPLE 18

*1,2-epoxy-3-(2,3-epoxy-2-phenylpropyl)cyclopentane*

To 79 g. of α-(2-cyclopentenylmethyl)styrene, which was maintained with stirring between 25 and 30°, there were added dropwise over a period of seventy-five minutes 320 g. of a 25.5 percent solution of peracetic acid in ethyl acetate. After an additional three hours between 30 and 41°, 97 percent of the theoretical amount of peracetic acid had been consumed. The volatiles were removed by codistillation with 775 g. of ethylbenzene, and the residue was distilled through a short column to give 42 g. of 1,2-epoxy-3-(2,3-epoxy-2-phenylpropyl)cyclopentane, B.P. 120°/0.2 mm.–143°/0.25 mm., n30/D 1.5338–1.5348. The cut boiling between 120 and 126° at 0.2 mm., n30/D 1.5347, was analyzed and showed:

Calcd. for $C_{14}H_{16}O_2$: C, 77.75; H, 7.46. Found: C, 77.76; H, 7.35.

EXAMPLE 19

*4-(or 5)-(2-cyclopentenyl)-3-(2-chloro-2-methylpropyl)cyclopentene*

Cyclopentadiene (396 g., 6 moles) was added during a period of one hour with stirring to a mixture of 3-chlorocyclopentene (615 g., 6 moles) and pulverized zinc chloride (1 g.), while the temperature was maintained at 0°. The mixture was stirred for an additional two hours at 0°. The crude cyclopentenylchlorocyclopentene was used for the further reaction with isobutylene in this form.

The crude cyclopentenylchlorocyclopentene was added during a period of two and one-half hours with stirring to a mixture of isobutylene (448 g., 8 moles) and pulverized zinc chloride (24 g.), while the temperature was maintained between —15 and —20°. The mixture was stirred for an additional two hours at —15 to —20° and then left standing overnight at —20°. After addition of petroleum ether (B.P. 35–37°, 500 ml.) the reaction product was washed with water and dried over calcium chloride. The petroleum ether was removed by distillation to give 1266 g. of residue product, 4-(or 5)-(2-cyclopentenyl)-3-(2-chloro-2-methylpropyl)cyclopentene.

EXAMPLE 20

*4-(or 5)-(2-cyclopentenyl)-3-methallylcyclopentene*

Crude 4-(and 5)-(2-cyclopentenyl)-3-(2-chloro-2-methylpropyl)cyclopentene (1246 g.) was added to an excess of potassium tert-butoxide (900 g., 8 moles) dissolved in refluxing tert-butanol (2 l.). The mixture was stirred for sixty-six hours while the temperature was maintained between 60 and 84°. After addition of petroleum ether (B.P. 35–37°, 1 l.), the product was washed twice with 6 liters of water and distilled through a 10″ column to give 746 g. (67 percent yield) of 4-(or 5)-(2-cyclopentenyl)-3-methallylcyclopentene, B.P. 67–70°/0.5 mm., n20/D 1.4950, d20/4 0.903. The infrared spectrum agreed with the assigned structure. Elemental analysis showed:

Calcd. for $C_{14}H_{20}$: C, 89.36; H, 10.64; $M_D$, 61.07; hydrogen number, 62.7. Found: C, 89.08; H, 10.84; $M_D$, 60.7; hydrogen number, 64.4.

There was also isolated 45 g. (6 percent yield) of lower boiling 3-methallylcyclopentene, B.P. 144–146° at atmospheric pressure, which arose from the reaction of unchanged cyclopentenyl chloride and isobutylene. In addition, 151 g. of higher boiling material was obtained, B.P. 70°/0.5 mm. 215°/1.35 mm., whose infrared spectrum was qualitatively very similar to that of the main product; it is believed to be mainly a mixture of 4-(or 5)-(2-cyclopentenyl)-3-methallylcyclopentene and the following olefin

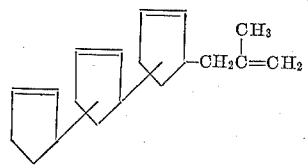

arising from the reaction of the telomeric tris(cyclopentenyl)chloride with isobutylene.

EXAMPLE 21

*1,2-epoxy-4-(or 5)-(2,3-epoxycyclopentyl)-3-(2,3-epoxy-2-methylpropyl)cyclopentane*

The 4-(and 5)-(2-cyclopentenyl)-3-methallylcyclopentene (500 g.) was charged to a five-liter flask fitted with stirrer, condenser, dropping funnel and thermometer. A solution of peracetic acid (751 g.) in ethyl acetate was added over a period of 6.25 hours. The reaction was exothermic and required a cooling bath to maintain a temperature of 25–30° during addition of the peracetic acid solution. The reaction mixture was then stored overnight in a brine bath at —5°. The volatiles were emoved by codistillation with ethylbenzene. Analysis of the residue product (654 g.) by the pyridine-hydrochloride method indicated a purity of 82 percent. Distillation afforded the triepoxide, 1,2-epoxy-4-(or 5)-(2,3-epoxycyclopentyl) - 3 - (2,3-epoxy-2-methylpropyl)cyclopentane, with 88 percent purity; B.P. 154° C./0.2 mm.; $n_D^{30}$ 1.4945. Elemental analysis showed:

Calcd. for $C_{14}H_{20}O_3$: C, 71.14; H, 8.55. Found: C, 70.85; H, 8.55.

EXAMPLE 22

*1,2-epoxy-3-(2,3-epoxy-2-methylpropyl)cyclopentane*

0.8 part of epoxide employed in each run.

| Hardener | Parts | Ratio [a] | Cure, Hrs./° C. | Resin Description |
|---|---|---|---|---|
| Diethylenetriamine | 0.2 | 1.0 | 8/120 6/160 | Strong, Barcol Hardness, 44. |
| Methylenedianiline | 0.5 | 1.0 | 8/120 6/160 | Strong. |
| Adipic acid | 0.44 | 0.6 | 8/120 6/160 | Soft. |
| Phthalic anhydride | 0.74 | 1.0 | 6/120 6/120 | Hard, brittle. |
| $BF_3$=Monoethylamine | 0.08 | | 8/120 6/160 | Do. |
| 15% Potassium hydroxide in ethylene glycol. | 0.056 | | 8/120 3/160 | Strong, Barcol Hardness, 20. |
| 5% $H_2SO_4$ in HOH (water) | 0.048 | | 8/120 6/160 | Hard, brittle. |

[a] Ratio of reactive groups of hardener per epoxide group.

EXAMPLE 23

*1,2-epoxy-3-(2,3-epoxypropyl)cyclopentane*

0.8 part of epoxide employed in each run.

All resins were cured for 1.5 hours at 120° plus 6 hours at 160°.

| Hardener | Parts | Ratio | Resin Description |
|---|---|---|---|
| Methylene dianiline | 0.5 | 1.0 | Hard, strong, Barcol Hardness-30. |
| Diethylene triamine | 0.2 | 1.0 | Hard, strong, Barcol Hardness-45. |
| Phthalic anhydride | 1.1 | 1.5 | Hard, strong, Barcol Hardness-40. |
| 15% Potassium hydroxide in Ethylene glycol. | 0.015 | 0.3% 0.04 | |
| Succinic anhydride-Glycerol adduct.[a] | 0.9 | 0.75 | Hard, strong. |
| Boron trifluoride monoethylamine complex. | 0.4 | | Hard. |
| 1,2,6-hexanetriol | 0.23 | 0.5 | Soft. |
| Borontrifluoride-monoethylamine. | 0.04 | | |
| Bisphenol A | 0.64 | 0.5 | Hard. |
| $BF_3$·monoethylamine | 0.04 | | |

[a] SAG (Succinic anhydride-Glycerol Adduct, 3 moles to 1 mole, respectively).

EXAMPLE 24

*1,2-epoxy-3-(2,3-epoxy-1,2-dimethylpropyl)cyclopentane*

0.9 part of epoxide employed in each run.

All resins were cured for 6.5 hours at 120° plus 7.5 hours at 160°.

| Hardner | Parts | Ratio | Resin Description |
|---|---|---|---|
| Diethylene triamine | 0.2 | 1.0 | Hard, brittle. |
| Methylene dianiline | 0.5 | 1.0 | Soft. |
| Phthalic anhydride | 1.1 | 1.5 | Hard, brittle. |
| 17% Potassium hydroxide in Ethylene glycol. | 0.12 | | Soft. |
| Boron trifluoride-Monoethylamine complex. | 0.1 | | Highly viscous. |
| Succinic anydride-glycerol adduct, 3 moles to 1 mole, respectively. | 0.9 | 0.75 | Do. |
| Bisphenol A | 0.6 | 0.5 | Hard, brittle. |
| 17% Potassium hydroxide in Ethylene glycol. | 0.08 | | |

EXAMPLE 25

*1,2-epoxy-3-(epoxyoctyl)cyclopentane*

1.1 parts of epoxide employed in each run.

All resins were cured 1.5 hours at 120° plus 6.5 hours at 160°.

| Hardner | Parts | Ratio | Resin Description |
|---|---|---|---|
| Diethylene triamine | 0.2 | 1.0 | Hard, brittle. |
| Phthalic anhydride | 1.1 | 1.5 | Do. |
| 15% Potassium hydroxide in Ethylene glycol. | 0.015 | | |
| Succinic anhydride-glycerol adduct. | 0.9 | 0.75 | Do. |
| Boron trifluoride-monoethylamine complex, i.e., ($BF_3$·MEA). | 0.06 | | Highly viscous. |
| 1,2,6-hexanetriol | 0.23 | .5 | Soft. |
| $BF_3$·MEA | 0.06 | | |
| Bisphenol A | 0.64 | .5 | Hard, brittle. |
| $BF_3$·MEA | 0.06 | | |

What is claimed is:

1. A compound from the class consisting of 3-(vic-epoxyalkyl)-vic-epoxycyclopentane, wherein the vic-epoxy moiety of said vic-epoxyalkyl group is at least one carbon atom removed from the vic-epoxycyclopentane nucleus; 3-(vic-epoxyalkyl-4-(or 5)-(vic-epoxycycloalkyl)-vic-epoxycyclopentane; and 3-(vic-epoxyalkyl-4-(or 5) - vic - epoxycycloalkyl - vic - epoxycycloalkyl) - vic-epoxycyclopentane; wherein the vic-epoxyalkyl substituent contains up to 18 carbon atoms and the vic-epoxycycloalkyl substituent contains 5 to 7 carbon atoms in the ring thereof.

2. 3-(vic-epoxyalkyl)-vic-epoxycyclopentane wherein the vic-epoxyalkyl substituent contains up to 18 carbon atoms and wherein the vic-epoxy moiety of said vic-epoxyalkyl group is at least one carbon atom removed from the vic-epoxycyclopentane nucleus.

3. 3-(vic-epoxyalkyl)-4-(or 5)-(vic-epoxycycloalkyl)-vic-epoxycyclopentane wherien the vic-epoxyalkyl substituent contains up to 18 carbon atoms and the vic-epoxycycloalkyl substituent contains 5 to 7 carbon atoms in the ring thereof.

4. 3-(vic-epoxyalkyl)-4-(or 5)-(vic-epoxycycloalkyl-vic- epoxycycloalkyl)-vic-epoxycyclopentane wherein the vic-epoxyalkyl substituent contains up to 18 carbon atoms and the vic-epoxycycloalkyl substituent contains 5 to 7 carbon atoms in the ring thereof.

5. 3-(vic-epoxyalkyl)-4-(or 5)-(vic-epoxycyclopentyl)-vic-epoxycyclopentane wherein the vic-epoxyalkyl substituent contains up to 18 carbon atoms.

6. 3-(vic-epoxyalkyl)-4-(or 5)-(vic-epoxycyclopentyl-vic-epoxycyclopentyl)-vic-epoxycyclopentane wherein the vic-epoxyalkyl substituent contains up to 18 carbon atoms.

7. 1,2 - epoxy - 3 - (2,3 - epoxy - 2 - methylpropyl)cyclopentane.

8. 1,2-epoxy-3-(2,3-epoxypropyl)cyclopentane.

9. 1,2 - epoxy - 3 - (2,3 - epoxy - 1,2 - dimethylpropyl)-cyclopentane.

10. 1,2-epoxy-3-(2,3-epoxyoctyl)cyclopentane.

11. 1,2 - epoxy - 3 - (2,3 - epoxy - 2 - phenylpropyl)-cyclopentane.

12. 1,2-epoxy-4-(or 5)-(2,3-epoxycyclopentyl)-3-(2,3-epoxy-2-methylpropyl)cyclopentane.

13. The cured resin obtained by heating the compound claimed in claim 1 to a temperature of from 25° C. to 250° C.

14. The cured resin obtained by heating the compound claimed in claim 2 to a temperature of from 25° C. to 250° C.

15. The cured resin obtained by heating the compound claimed in claim 3 to a temperature of from 25° C. to 250° C.

16. The cured resin obtained by heating the compound claimed in claim 5 to a temperature of from 25° C. to 250° C.

17. The cured resin obtained by heating the compound claimed in claim 6 to a temperature of from 25° C. to 250° C.

18. A curable composition comprising the compound claimed in claim 1 and from 0.1 to about 4 active groups of an active organic hardener selected from the group consisting of polycarboxylic acids, polycarboxylic acid anhydrides, polyols, and polyfunctional amines per vicepoxy group of the epoxide compound.

19. The cured resin obtained by heating the curable composition claimed in claim 18 to a temperature of from 25° C. to about 250° C.

References Cited by the Examiner
UNITED STATES PATENTS

| | | | |
|---|---|---|---|
| 2,434,289 | 1/1948 | Schmerling | 260—666 |
| 2,502,569 | 4/1950 | Ipatieff et al. | 260—666 |
| 2,918,439 | 12/1959 | Phillips et al. | 260—2 |
| 3,023,174 | 2/1962 | Batzer et al. | 260—2 |

WILLIAM H. SHORT, *Primary Examiner.*

J. T. LIBERMAN, *Examiner.*

T. D. KERWIN, T. E. PERTILLA, *Assistant Examiners.*